United States Patent [19]
Koether et al.

[11] Patent Number: 5,331,575
[45] Date of Patent: Jul. 19, 1994

[54] SHORTENING MANAGEMENT SYSTEM

[75] Inventors: Bernard G. Koether, Tequesta, Fla.; Allan E. Witt, Westport; Charles A. Maher, Jr., Stratford, both of Conn.

[73] Assignee: Technology Licensing Corporation, Tequesta, Fla.

[21] Appl. No.: 695,422

[22] Filed: May 3, 1991

[51] Int. Cl.⁵ .............................. G01K 17/14
[52] U.S. Cl. .................... 364/557; 364/400; 364/550; 219/492; 219/494; 219/441; 99/324; 99/325; 99/328; 99/330
[58] Field of Search .............. 364/557, 496, 499, 144, 364/483, 400, 550; 219/492, 494, 497, 441, 442; 377/16; 374/102; 99/324, 325, 326, 327, 328, 330, 332

[56] References Cited

U.S. PATENT DOCUMENTS

| | | | |
|---|---|---|---|
| 4,131,786 | 12/1978 | Cooper | 219/487 |
| 4,259,567 | 3/1981 | Moore et al. | 219/327 |
| 4,282,423 | 8/1981 | Volz | 219/492 |
| 4,390,965 | 6/1983 | Albert | 364/400 |
| 4,437,159 | 3/1984 | Waugh | 364/400 |
| 4,499,357 | 2/1985 | Kojima | 219/10.55 |
| 4,506,995 | 3/1985 | Polster | 374/57 |
| 4,601,004 | 7/1986 | Holt et al. | 364/557 |
| 4,636,949 | 1/1987 | Longabaugh | 364/400 |
| 4,644,137 | 2/1987 | Asahi et al. | 219/497 |
| 4,688,475 | 8/1987 | Witt et al. | 99/325 |
| 4,742,455 | 5/1988 | Schreyer | 364/400 |
| 4,796,204 | 1/1989 | Inoue | 364/550 |
| 4,812,963 | 3/1989 | Albrecht et al. | 219/492 |
| 4,884,626 | 12/1989 | Filipowski | 165/12 |
| 4,913,038 | 4/1990 | Burkett et al. | 99/331 |
| 5,038,676 | 8/1991 | Davis et al. | 219/494 |
| 5,060,559 | 10/1991 | Winter | 99/325 |

*Primary Examiner*—Jack B. Harvey
*Assistant Examiner*—Hal D. Wachsman
*Attorney, Agent, or Firm*—Pennie & Edmonds

[57] ABSTRACT

Computer controlled cooking apparatus for extending the life of shortening utilizing a host computer to lower the average temperature to which the shortening is subjected, a cooking computer within each cooking apparatus to determine when a filter operation should occur based upon how many of each of a plurality of foods have previously been cooked, a technique for locking out future cook cycles until a filter operation has occurred so that the quality of the shortening is maintained, and a technique to prevent shortening from burning by ensuring that the solidified shortening is gradually melted before it is subjected to the much higher power. Additionally, a cooking profile for each food is utilized in order to determine if food being cooked during a power failure may continue to be cooked when the power is restored or if such food may be discarded.

18 Claims, 2 Drawing Sheets

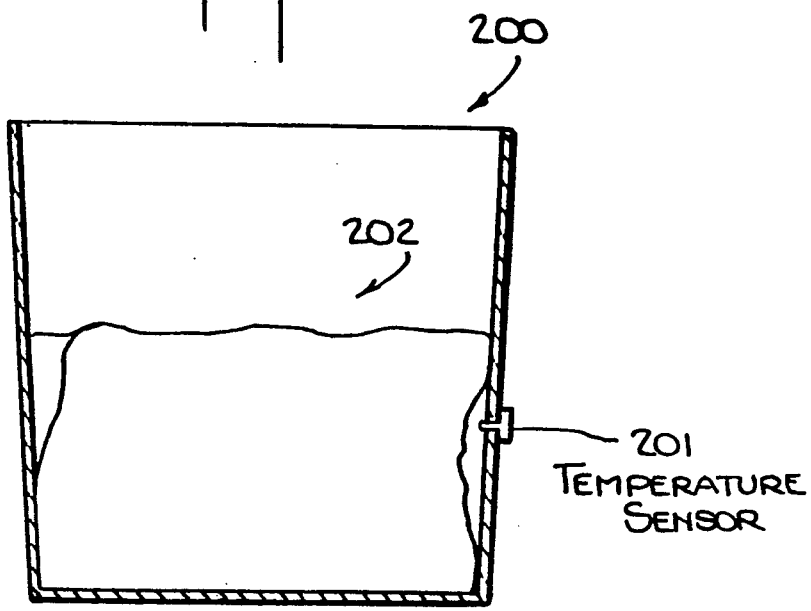
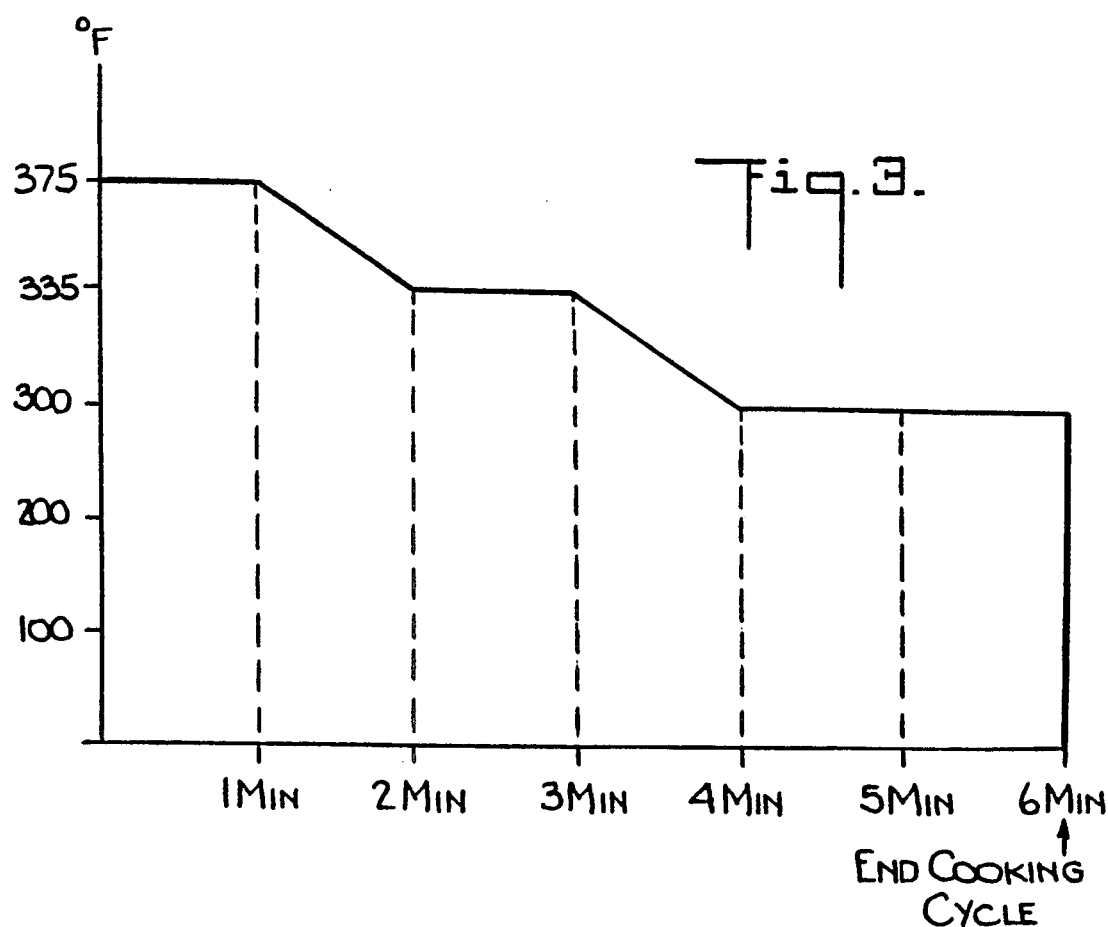

SHORTENING MANAGEMENT SYSTEM

TECHNICAL FIELD

This invention relates to cooking apparatus, and more particularly to an improved computer controlled cooking apparatus.

DESCRIPTION OF THE PRIOR ART

Computer controlled cooking apparatus are well known in the art and are widely used in, for example, fast food restaurants. The purpose of computer controlling the cooking apparatus is to eliminate the need for human intervention in the cooking process to the greatest extent possible. In national fast food chains, computer control of the cooking apparatus ensures that the food at a restaurant in Maine or New York, for example, will be cooked the same and will taste the same as the food at another restaurant located in California, for example. Moreover, the computer controlled cooking apparatus ensures that high turnover rates among workers in the restaurant do not affect the cooking process.

Many of such computer controlled cooking apparatus use oil or shortening in the preparation of various foods. Examples of such foods are french fries, fried chicken, pastries and donuts, all served in a variety of fast food restaurants. The shortening however, must be periodically filtered, periodically changed, and monitored on an ongoing basis to ensure that quality does not degrade beyond an acceptable value. As the quality degrades below an acceptable value, the shortening becomes too acidic, giving a disagreeable taste to the food, and its color becomes very dark, imparting an "overdone" color to the product. The shortening must be changed.

With regard to the shortening quality, it is known that by filtering the shortening periodically and, where possible, automatically, the contaminants therein are removed, the shortening life extended and cooking quality improved. In the present art, the frequency at which the shortening must be filtered is measured in terms of cook cycles, i.e., after every N cook cycles, the shortening must be filtered.

A filter operation typically involves draining the liquid shortening from the cooking apparatus, running the shortening through a filter and into a receptacle, and then pumping the filtered shortening back into the cooking apparatus. Additionally, a small percentage of modern computer controlled cooking apparatus include built-in filtering devices.

Filter lockout means are normally provided in the prior art which, after a predetermined number of cook cycles, will try to prevent the cooking apparatus from being used again until the filter operation has occurred. In one implementation, the filter lockout is activated for a predetermined amount of time, after which it is assumed that a filter operation has taken place. Another technique for implementing lockout is to measure the change in shortening temperature, and after the shortening temperature drops by a predetermined amount, assume that the filtering has taken place.

The problem with the above techniques is that the restaurant personnel, often in a rush to serve customers or to avoid the effort, have devised many clever ways in which to bypass the filter lockout means in order to avoid the time consuming filter operation. For example, in the case where the shortening temperature is measured in order to determine if the filtering has occurred, a cold rag placed upon the temperature sensor will immediately fool the device into thinking that the filtering has taken place because of the severe drop in temperature. Thus, rather than wait for a filter operation to complete, restaurant personnel simply fool the device into immediately ending the filter operation.

In systems which have no nonvolatile memory means, simply turning the power off and on again will fool the machine into thinking that the filter operation has taken place.

Another problem contributing to shortening degradation is the intense and often excessive heat to which the shortening must be subjected. One reason for such intense heat is that the shortening in all cooking apparatus must be kept hot enough so that at any time during the day, the cooking apparatus can be used to cook food without first having to wait for the shortening to heat up. Consequently, the shortening is kept hot all day, even though it may only be used a small portion of the time.

When new shortening is first introduced into a cooking apparatus, a startup power is applied until the shortening is melted, whereafter a higher power is applied. The startup power may actually be pulsed on and off, where the duty cycle of the pulsing signal is adjusted so that the average power supplied to the cooking apparatus is the desired startup power. The determination of when to apply the higher power is accomplished by measuring the temperature of the shortening. When the temperature is such that the shortening is liquified, the power is increased to raise the temperature to the required cooking temperature.

Sometimes solid shortening is used in a cooking apparatus. One problem is that when the solidified shortening is packed into the cooking apparatus, it may not be in solid contact with the entire inner surface area of the cooking apparatus. Consequently, the temperature probe within the wall of the cooking apparatus may be measuring nothing more than the temperature of a pocket of air between the solidified shortening and the inner wall of the cooking apparatus. Therefore, the cooking apparatus will sense that the temperature of the shortening is much higher than is really the case. This, in turn, results in a much higher power being applied prematurely to the solidified shortening. As a result, the shortening may scorch, and a fire may result.

A related problem in shortening quality is that of power failures which occur during the cook cycle. Since the cooking apparatus is electronically controlled, after a power failure is over, a decision must be made as to whether or not to resume the cook cycle and whether the food that was being cooked is still usable, or, whether such food has been spoiled for further use. Additionally, it must be determined if the interrupted and possibly aborted cook cycle should count in determining when the next filter operation should occur. Incorrect decisions in this regard will result in distasteful properties in the foods as well as the more serious potential of a health hazard.

U.S. Pat. No. 4,636,949, issued on Jan. 13, 1987 to C. R. Longabaugh, describes a system for attempting to save food after a power outage. The technique used is to store in nonvolatile memory the time of the power outage as well as the temperature of the shortening at that time. When power is resumed, if the shortening has dropped by a predetermined amount, or if too much time has elapsed, it is assumed that the food cannot be saved. The values of time and temperature beyond which the food cannot be saved are determined empirically and vary depending upon the shortening used, the food being cooked, and the cooking apparatus itself. Moreover, a level of tolerance must also be established. However all of these parameters are unique to the particular user and the particular system and can be determined empirically in accordance with well known techniques.

The Longabaugh arrangement provides some salvaging of the food being cooked; however, it is not optimum because, depending upon when and where in the cook cycle the power outage occurs, the parameters used to determine whether or not the food can be saved may vary. For example, if the power goes out for one minute at the beginning of the cook cycle this may not have the same effect as the power going out for one minute at the end of the cook cycle. Consequently, while the decision as to whether or not the food being cooked can be saved may be different in those two situations, the food must always be discarded in order to be certain that all food served to the customer meets standards.

It is an object of the present invention to provide an improved means for determining when a filter operation must occur, and for providing an improved technique for locking out future cook cycles until the filter operation has occurred.

It is another object of the invention to provide an improved technique for preventing restaurant personnel from overriding filter lockout mechanisms and thereby degrading the quality of the food and/or shortening.

It is a further object of the invention to provide an improved technique for recovering from a power failure which occurs during a cook cycle in fast food cooking apparatus.

It is still another object of the invention to provide a technique for extending the life of shortening by minimizing the amount of time that the shortening must remain at an extremely hot temperature.

It is a further object of the invention to provide an improved technique of determining when the shortening must be changed.

Other and further objects of the invention will become apparent during the course of the following detailed description of the preferred embodiment and with reference to the accompanying figures.

SUMMARY OF THE INVENTION

These and other objects are achieved in accordance with the present invention which relates to an improved shortening management system for use in, for example, a fast food restaurant environment. In accordance with one aspect of the invention, each time a cook cycle takes place, a record of the cook cycle is stored in nonvolatile memory, and a determination as to when to filter the shortening is made based upon the total cook cycles which have taken place. Importantly, each cook cycle is weighted with a factor indicative of the degradation to the shortening caused by the cook cycle, where the weighting factor is determined based upon which food has been cooked and how much thereof has been cooked.

An improved filter lockout means is provided by utilizing the fact that the temperature curve exhibited by the shortening during a filter operation is known. Accordingly, if during a filter operation, the shortening is measured to cool much faster than expected, it is assumed that the temperature sensor has been rapidly cooled in an attempt to bypass the filter lockout means. An alarm may then be sounded or future cook cycles may continue to be locked out for a programmed time interval equivalent to that of a normal filter cycle.

After a predetermined percentage of a cook cycle has completed, it is assumed for purposes of the filter lockout that the entire cook cycle is completed. Thus, if one quarter of a cook cycle is performed for example, this cook cycle will be accounted for as an entire cook cycle in calculating when to perform a filter operation. Since most contaminants deposited in the shortening are deposited within the first portion of the cook cycle, the data resulting from such an approach will more accurately reflect the condition of the shortening.

In another aspect of the invention, the time and temperature during a startup cycle is monitored so that if the temperature rises too quickly, it is assumed that pockets of air have been formed and the cooking apparatus is maintained at the startup level, even though the temperature sensor indicates that the shortening is completely melted. By considering both the temperature and startup time in determining when to elevate the power supplied to the cooking apparatus, damage to the shortening is prevented.

In other aspects of the invention, a host computer is in communication with a plurality of cooking computers, each attached to a cooking apparatus. The cooking computer monitors the heat history of the shortening in its cooking apparatus and transmits this information to the host computer which determines when the heat history indicates that the shortening quality has degraded. When such an indication occurs, the cooking apparatus signals that the shortening should be changed.

In another aspect of the invention, a host computer coordinates cooking management among the plurality of cooking computers and ensures that the average temperature of the shortening is kept at a minimum by heating up the shortening only immediately prior to the time it is to be used and leaving the shortening at a much lower idle temperature at all other times. This operation is dependent upon total kitchen demand, work in process, and inventory.

BRIEF DESCRIPTION OF THE DRAWINGS

FIG. 2 is a pictorial representation of liquid shortening pockets which occur during startup of a cooking apparatus; and FIG. 3 shows an exemplary cooking curve for a particular fast food.

DETAILED DESCRIPTION OF THE PREFERRED EMBODIMENT

Figure 1:
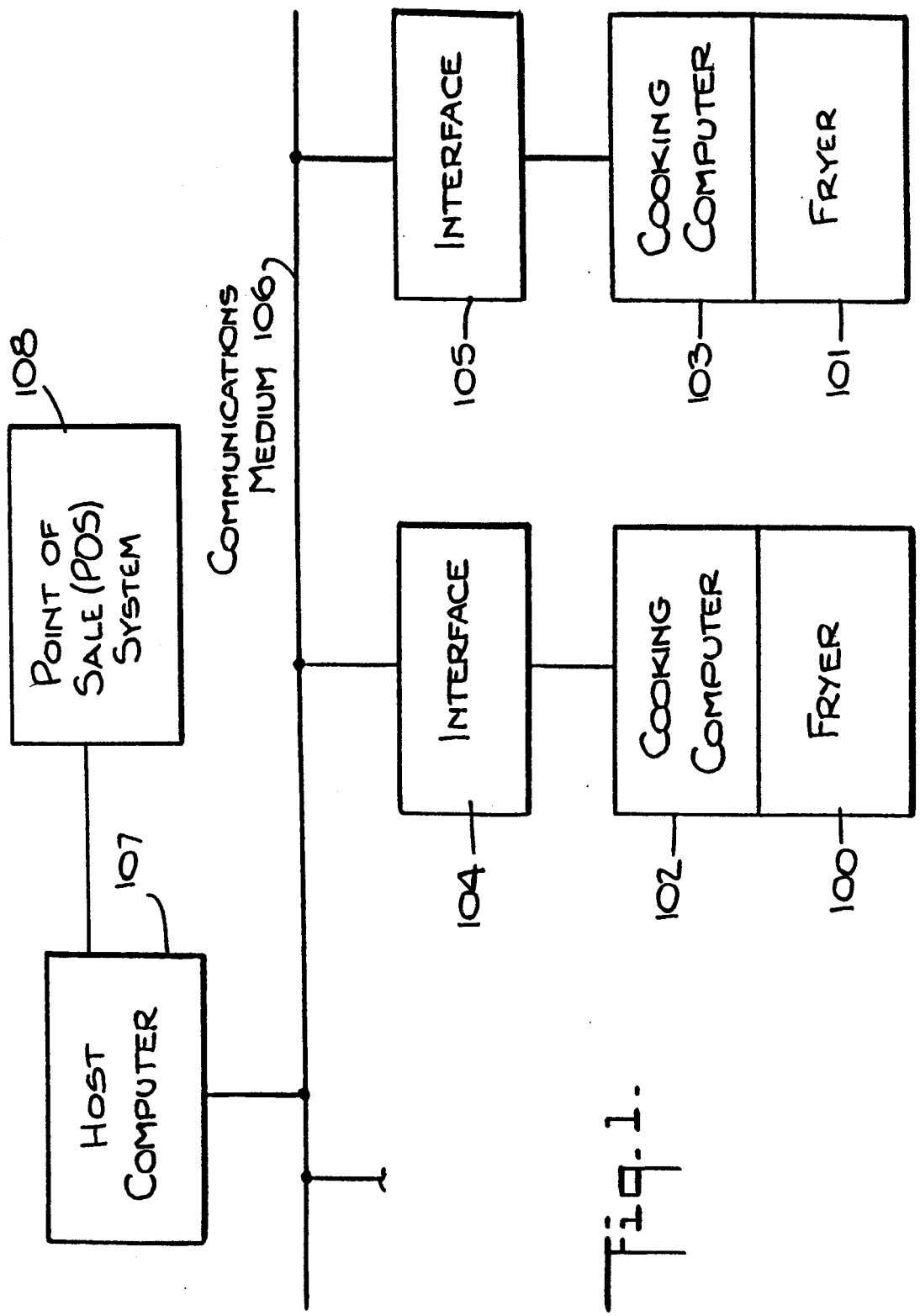
FIG. 1 shows two exemplary cooking apparatus in communication with a host computer over a communications medium.

FIG. 1 shows a plurality of cooking apparatus for use in a fast food restaurant, all networked together and arranged to communicate with host computer 107. More details regarding the system in FIG. 1 are described in U.S. Pat. No. 4,812,963 issued Mar. 14, 1989 and assigned to the assignee of this application. The teachings of the '963 patent are hereby incorporated by way of reference.

The arrangement of FIG. 1 includes cooking apparatus 100–101 labeled as fryers in the figure, cooking computers 102–103, network interfaces 104–105, communications media 106, a host computer 107, which may be a personal computer or a larger computer if desired and point-of-sale (POS) system 108. POS system 108 may be, for example, cash registers which communicate with the host computer to provide sales data to the host. Moreover, host computer 107 can be communicated with from outside the store via a telephone line and a modem either internal or external to host computer 107.

As shown in FIG. 1, each cooking apparatus includes its own cooking computer for controlling the cooking apparatus. In accordance with an aspect of the invention, the cooking computer is programmed to determine when the shortening must be filtered by maintaining records of what has been cooked in the shortening and then adjusting the filter frequency accordingly.

Specifically, the appropriate time to filter is determined in part by the amount and kind of contaminants that are introduced into the shortening when a product is cooked. Cooking french fries, for example, introduces far fewer contaminants than does cooking a breaded product. Certain coated fried chicken products may require filtering after every cook cycle. Depending upon the types of food and the frequency at which these foods are cooked in the shortening, all unique to the particular restaurant, the interval between shortening filterings will vary. The present invention compensates for this effect, as described below.

As can be determined empirically, each type of food cooked in the shortening may be cooked a separate particular number of times before a filter operation must be executed. For example, if a particular cooking apparatus cooks only french fries, the apparatus may be able to execute ten cook cycles before the need for filtering arises. If, on the other hand, a cooking apparatus is used only to cook breaded products, a filter operation may be required after every three cook cycles. With this in mind, it is possible to weight the effect of cooking various different types of foods in a single fryer.

Consider the following formula:

$$\text{filter total} = (c_1)(\text{food}_1) + (c_2)(\text{food}_2) + (c_3)(\text{food}_3)\ldots$$

where $c_1$, $c_2$, and $c_3$ are the weighting coefficients associated with each of foods $\text{food}_1$, $\text{food}_2$, and $\text{food}_3$, respectively.

Each time a food product key is selected, data is stored in non-volatile RAM regarding the type and amount of food product cooked. The formula then provides, in effect, the total degradation of the shortening wherein the effect of each of the different foods is weighted by an appropriate coefficient, where the coefficient for each food is determined empirically. In the example above, the coefficient for french fries would be 0.1 since 10 cook cycles may be executed before the french fryer requires a filter operation, whereas the coefficient for fried chicken would be $\frac{1}{3}$, since three cook cycles may be executed before a filter operation is required in a chicken fryer. Any time that the variable flt_tot equals or exceeds one, the filter lockout mechanism is activated and the cooking computer will not allow the cooking apparatus to cook any more food until a filter operation is performed. In this manner, the varying effects of the different types of foods are accounted for in the determination of whether or not to filter the shortening.

It should be noted that all of the parameters, coefficients, and calculations may be stored and/or executed in host computer 107 or, alternatively, they may be implemented in each individual cooking computer 102-103.

Additionally, the coefficients or any of the other parameters may be varied by means of operator input at the host computer 107 or via other work stations connected to the network. Finally, it should be noted that the filter lockout mechanism can be overridden via, for example, a password system at each individual cooking computer 102-103 or by a communication from host computer 107.

Having described the improved technique for determining when filtering should occur, there remains the problem of preventing store personnel from devising clever ways to circumvent the filter lockout means. This is addressed in a variety of manners, as described below.

One technique commonly used in overriding the filter lockout means is to power the system off and back on again. The memory of the cooking computer is then reinitialized and there is no record of how many cook cycles have taken place or, if the power was turned off during a filter operation, of the filter operation.

In accordance with the invention, nonvolatile memory is provided in order to store the filtering status and the current time so that if the system is powered down this data is not lost. When the power goes back on again, the system will "remember" how many cook cycles have occurred, how much of the interrupted cycle has elapsed, and when a filter operation should occur. Thus, turning the system power off and on again will not defeat the filter lockout mechanism. Additionally, if the system is powered down during a filter operation, when power is restored it will "know" to continue the filter operation. Moreover, if a significant amount of time has passed since the system has been powered down during a filter operation, it may be determined that the shortening must be checked to see if it has possibly solidified, thereby rendering it impossible to continue the filter operation. Such a situation might result, for example, where the filter operation was shut down at the end of the night as the restaurant was closed and not turned back on again until the following day. It should be noted, however, that restaurant personnel attempting to circumvent the filter operation by powering off and on the system will be unsuccessful, as the system will be programmed so that for short power outages, i.e., several minutes, the filter operation will just continue from the same point it was at when the power was turned off.

Another technique used in prior art filtering lockout systems is based upon the fact that filtering of the shortening gradually cools it. Thus, a temperature sensor is utilized within the cooking apparatus and the temperature of the shortening is monitored. When a filter operation begins, the gradual decline in shortening temperature is measured and when the shortening reaches a specified temperature, it is determined that the filter operation is complete. However, this is easily circumvented by restaurant employees placing a cold rag over the temperature sensor, and thereby "fooling" the cooking computer into believing that the filter operation is complete.

The present invention utilizes either a host computer 107 or one of the cooking computers 102-103 to store an expected cooling curve, that is particular to an individual appliance, for the shortening during filter operations. For example, it can be determined based upon empirical data and upon the particular type of shortening being utilized, that the temperature should drop one degree per second. And/or as another example, actual filtering temperature profiles can be collected to match the tested empirical data which has been stored. Moreover, it can also be determined that from the start of a filter operation until the end thereof, the total temperature drop should be ten degrees. With this in mind, the cooking computer is programmed so that if the ten degree drop in temperature takes place in only two or three seconds, it is determined that an attempt is being made to quickly cool the temperature sensor and bypass the filter lockout mechanism. Accordingly, measures may be taken to prevent such circumvention, such as notifying a supervisor via the host computer, automatically sounding an alarm, or simply continuing the lockout of the future cook cycles for the expected filter time.

Another enhancement provided to the present invention is that aborted cook cycles may be included based upon whether or not the majority of the degradation to the shortening has occurred before the cook cycle was stopped. For example, in breaded items, the majority of the contaminants, i.e., particles of the breading which fall off the food item, are deposited into the shortening and cause degradation thereof in the first few seconds of the cook cycle. Thus, cook cycles which are aborted shortly thereafter are recorded as complete cycles for purposes of the previously included formula if a predetermined percentage of the cook cycle has been completed. The predetermined percentage varies from item to item. The predetermined percentage can be calculated by using empirical means.

Another optional enhancement to the invention eliminates the scorching of the shortening as a result of "pockets" in unmelted shortening. This phenomenon is further described below with reference to FIG. 2.

FIG. 2 is a representation of a cooking apparatus 200 including newly added and solidified shortening 202 and temperature sensor 201. When the cooking apparatus is initially turned on, "startup" power is applied in order to gradually melt the shortening. When temperature sensor 201 senses that the temperature of the shortening is such that it is in liquid form, the power is then greatly elevated to a much higher power and the temperature of the liquid shortening is greatly increased.

As can be seen from FIG. 2, there is an inherent problem with this technique. When the newly added shortening 202 is first placed into the cooking apparatus 200, it does not conform to the shape of the cooking apparatus because of its nearly solid form. While the restaurant personnel may attempt to pack the shortening against the sidewalls, it nonetheless cannot be assured that the solidified shortening will conform to the shape of the cooking apparatus. Consequently, gaps denoted "pockets", can be formed around the temperature sensors. Such pockets are filled with air and are indicated, for example, by the area nearby temperature sensor 201. Air heats up much faster than shortening, and when the air which fills the pocket heats up to the appropriate temperature, the power supplied to the cooking apparatus is elevated to raise the temperature, even though most of the shortening has not yet liquified. As a result, much of the solidified shortening is subjected to temperatures well above what is proper. Consequently, the shortening life is greatly decreased and the shortening may become scorched as it melts. Furthermore, in extreme circumstances, a fire may result.

The problem is overcome by monitoring the shortening temperature as it melts and by utilizing an internal clock to track the elapsed time of melting. The startup power is maintained until both the proper melting time has elapsed and the shortening temperature indicates that the shortening has liquified. In this manner, if shortening pockets form as indicated in FIG. 2, the startup power will still be maintained, rather than cooking power being applied and burning the solidified shortening.

Another aspect of the invention is a novel technique for minimizing the amount of time that the shortening in each cooking apparatus must remain at the extremely hot cooking temperature. Referring now to FIG. 1, it can be seen that the host computer 107 is in electrical communication with cooking computers 102, 103 and others not shown. Host computer 107 can manage the network of cooking computers in order that the shortening need not be maintained at the extremely high cooking temperature throughout the day, as described below.

Host computer 107 includes a database with information regarding which food items can be cooked in each of the cooking apparatus connected to the network, as well as how many of each particular food item the cooking apparatus can cook during a particular cook cycle. Additionally, host computer 107 is in electrical communication with the cash registers so that it also knows how many of each food item are sold. Furthermore, host computer 107, being in electrical communication with each of the cooking apparatus, can also ascertain how many of each food item have been cooked and are thus available. Finally, host computer 107 can utilize all this data in order to determine how many of any food item are presently in holding and are available for immediate sale.

Since host computer 107 knows how many of each particular food item are in holding and available for immediate sale and also knows how many of each particular food item any cooking apparatus can cook in a particular cook cycle, host computer 107 can ensure that at least enough cooking apparatus remain at starting temperature so that they can cook the food items immediately if need be. Importantly, all remaining cooking apparatus need not remain at such a high power level throughout the day. The novel technique is best described by way of example, as set forth below.

Consider a system with more than one computer controlled fryer. Presume there are three levels of readiness for each fryer: high (cook starting temperature), medium and low. One fryer is always kept at the high temperature, another at the medium and the rest at low. These numbers are programmable; for example, two at high, two at medium, and the rest at low. The high fryer is not always the same fryer. The host computer reassigns this "ready-cook" (high) role among all the fryers in order to evenly distribute the heat load.

If for any reason a cook cycle is started on the "ready-cook" fryer, then the next fryer in the activation order is brought from the medium level to high. At the same time, another is brought from low to medium. In this manner there is always one unit idling at the high level and is, therefore, ready to cook when needed.

The host computer 107, which is in communications with the store's POS as well as the fryers, can call more than one fryer to the high level based on its assessment of the current food readiness status. The host computer knows what has been cooked, what has been sold, what is in the holding area, and how much holding time is left. It can, therefore, anticipate when and which type of food will need to be cooked. The real-time clock is also an important factor since it can alert the host computer to known rush hours as well. Since this real-time clock is a calendar clock it can also be programmed to recognize local holidays, weekends and other times that offset the level of business in a given store. The network will update all real-time clocks so they are identical.

In another embodiment, the entire heat history of shortening in a particular cooking apparatus may be monitored. The cumulative heat history then can be correlated as to shortening quality so that when the cumulative heat history exceeds a predetermined value, the computer signals that the shortening needs to be changed. The heat history may be computed, for example, by integrating the oil temperature over time.

In another aspect of the invention, the cooking curve for the particular food item being cooked is utilized in order to ascertain whether or not a power outage occurring during a cook cycle requires the food being cooked to be discarded. FIG. 3 shows an exemplary cooking curve for a food product. As can be seen from FIG. 3, the exemplary product requires six minutes of cooking time. During the first minute, the product is subjected to 375° F., and during the second minute the temperature drops linearly until 335° F. is reached after two minutes of cook time. During the third minute of cook time, the temperature is maintained at 335° F., after which it drops to 300° F. where it is maintained until the end of the cooking time.

The cooking curves of each of a plurality of foods to be cooked in the cooking apparatus are stored in a protected memory. During the cook cycle, the cooking curve exhibited in FIG. 3 is utilized by the cooking computer so that the cooking computer always knows where in the cook cycle the cooking apparatus is. If a power outage occurs, the information from the cooking curve of FIG. 3 can be utilized to determine more accurately whether or not the food being cooked can be saved. Specifically, if a power outage were to occur after the four minute mark in the cooking cycle, even a short duration may require that the food be discarded, because the temperature of the cooking apparatus would not be maintained at the 300° F. level which is required from four minutes through six minutes of the cooking curve. However, if a power outage should occur, for example, at the one minute mark or at the three minute mark, it is likely that the food being cooked in the cooking apparatus can in fact be saved because the cooking curve exhibits a sharp drop in temperature at these times. Consequently, a power outage will have little, if any effect, because the temperature of the cooking apparatus will simply drop as it would anyway even if there were no power outage.

By utilizing cooking curves for each of a plurality of foods, less food will have to be discarded as a result of power outages which occurred during a cook cycle. Moreover, it should be emphasized that the cooking curves of each food and in each restaurant are user determined in accordance with the particular foods, the particular style of cooking, and the particular recipe of by the restaurant. These same curves are used to determine where to resume the cook cycle after a power outage has occurred and the determination made to resume cooking.

In accordance with the above aspects of the invention, it can be appreciated that the shortening life is significantly extended and the quality of the foods cooked therein is significantly improved. While the above describes the preferred embodiment of the invention, it can be appreciated that various modifications may be made without violating the spirit and scope of the invention. Moreover, while frying has been discussed for purposes of explanation, it is to be understood that the invention is also applicable to boiling, baking, or even cooling, as in the case of a freezer.

What is claimed is:

1. Apparatus for preventing a cooking apparatus from being utilized to cook foods until a maintenance operation is performed comprising:
   means for monitoring temperature of a cooking fluid in the cooking apparatus during said maintenance operation;
   means for monitoring elapsed time of the maintenance operation; and
   means for preventing the cooking apparatus from cooking food until a predetermined amount of elapsed time of the maintenance operation and a predetermined temperature of the cooking fluid are reached.

2. Apparatus of claim 1 wherein the maintenance operation is a filter operation.

3. Apparatus of claim 1 wherein said means for monitoring the elapsed time includes battery-backed up clock means for continuing to monitor said elapsed time in the event of a power failure.

4. Apparatus of claim 1 wherein said means for monitoring the temperature includes means for storing a value representative of the temperature in the event of a power failure and said means for monitoring the elapsed time includes means for storing the elapsed time in the event of a power failure.

5. A computer for controlling a plurality of cooking apparatus, said computer comprising:
   means for storing a predetermined maximum anticipated customer demand for at least one type of food item;
   means for communicating with each of said cooking apparatus to determine how many of each of said at least one type of food item have been cooked; and
   means for signaling at least a first subset of the cooking apparatus based on the maximum anticipated customer demand and the amount of food cooked so that said first subset of the cooking apparatus is substantially immediately available to cook food items in order to meet the maximum anticipated customer demand.

6. The apparatus of claim 5 wherein a second remaining subset of cooking apparatus are maintained at a lower power level than the first subset of cooking apparatus.

7. The apparatus of claim 6 wherein said lower power level is maintained by pulsing a higher power signal on and off during predetermined intervals.

8. A method of preventing a cooking apparatus from being utilized to cook foods until a maintenance operation is performed comprising:
   monitoring temperature of a cooking fluid in the cooking apparatus during a time said maintenance operation should be performed;
   monitoring elapsed time of the maintenance operation; and
   preventing the cooking apparatus from cooking food until a predetermined amount of elapsed time of the maintenance operation and a predetermined temperature of the cooking fluid are reached.

9. The method of claim 8 wherein the maintenance operation is a filter operation.

10. The method of claim 8 wherein said step of monitoring the elapsed time includes the step of continuing to monitor said elapsed time via a battery-backed up clock means in the event of a power failure.

11. The method of claim 8 wherein said step of monitoring the temperature includes the step of storing the temperature in the event of a power failure and said step of monitoring the elapsed time includes the step of storing the elapsed time in the event of a power failure.

12. A method of controlling a plurality of cooking apparatus, said method comprising the steps of:
storing a predetermined maximum anticipated customer demand for at least one type of food item;
communicating with each of said cooking apparatus to determine how many of each of the said at least one type of food item has been cooked; and
comparing the number of food items determined to have been cooked with the stored anticipated customer demand to determine a differential between cooked items and anticipated demand;
signaling at least a first subset of the cooking apparatus based on the maximum anticipated customer demand and the amount of food cooked so that said first subset of the cooking apparatus is substantially immediately available to cook food items in order to meet the maximum anticipated customer demand.

13. The method of claim 12 comprising maintaining a second remaining subset of cooking apparatus at a lower power level than the first subset of cooking apparatus.

14. The method of claim 13 further comprising pulsing a higher power signal on and off during predetermined intervals to maintain said lower power level.

15. Control apparatus for controlling a cooking apparatus, the cooking apparatus being adapted for cooking food in a cooking fluid which solidifies when cooled to a predetermined temperature, said control apparatus comprising:
means for providing a first level of power to the cooking apparatus when it is determined that the cooking fluid is in a solidified state;
means for monitoring the temperature of said cooking fluid and the time during which said cooking fluid has been subjected to said first power level; and
means for providing a second higher level of power to the cooking apparatus when said means for monitoring indicates that said cooking fluid is of sufficient temperature and has been subjected to said first power level for a sufficient time such that said cooking fluid is in a substantially liquified form.

16. A method for controlling a cooking apparatus, the cooking apparatus being adapted for cooking food in a cooking fluid which solidifies when cooled to a predetermined temperature, comprising the steps of:
providing a first level of power to the cooking apparatus when is it determined that the cooking fluid is in a solidified form;
monitoring the temperature of the cooking fluid and the time during which the cooking fluid has been subjected to said first power level; and
providing a second higher power level to the cooking apparatus when it is determined that the cooking fluid is of sufficient temperature and has been subjected to the first power level for a sufficient time such that the cooking fluid is in a substantially liquified form.

17. Apparatus for determining when a cooking fluid in a cooking apparatus should be changed comprising:
means for monitoring the heat to which said cooking fluid is subjected, wherein said heat monitoring means includes means for integrating temperature of said cooking fluid over a predetermined time interval; and
means for determining that said cooking fluid should be changed when the entire heat to which said cooking fluid has been subjected exceeds a predetermined value.

18. A method on determining when a cooking fluid in a cooking apparatus should be changed comprising the steps of:
monitoring the heat to which said cooking fluid is subjected, wherein said monitoring step includes integrating temperature of said cooking fluid over a predetermined time interval; and
determining that said cooking fluid should be changed when the entire heat to which said cooking fluid has been subjected exceeds a predetermined value.

* * * * *